United States Patent

Wright et al.

[11] Patent Number: 6,022,933
[45] Date of Patent: Feb. 8, 2000

[54] PROCESS FOR THE PREPARATION OF POLYETHYLENE

[75] Inventors: Dale Andrew Wright, Charleston, W. Va.; Theodore Randolph Engelmann, Bound Brook; Antonios Nicholas, Belle Mead, both of N.J.; Francois Alexandre, Anjou, Canada

[73] Assignees: Union Carbide Chemicals & Plastics Technology Corporation, Danbury, Conn.; Peiromont and Company Limited, Montreal, Canada

[21] Appl. No.: 08/911,263

[22] Filed: Aug. 14, 1997

[51] Int. Cl.[7] .......................... C08F 2/34; C08F 210/16; C08F 4/78
[52] U.S. Cl. .......................... 526/68; 526/127; 526/129; 526/134; 526/348.5; 526/901; 526/905
[58] Field of Search .......................... 526/88, 127, 129, 526/134, 348.5, 901, 905, 68

[56] References Cited

U.S. PATENT DOCUMENTS

| | | | |
|---|---|---|---|
| 3,790,550 | 2/1974 | Miller | 260/94.9 |
| 4,003,712 | 1/1977 | Miller | 23/288 |
| 4,588,790 | 5/1986 | Jenkins, III et al. | 526/70 |
| 5,137,994 | 8/1992 | Goode et al. | 526/75 |
| 5,625,012 | 4/1997 | Hussein et al. | 526/74 |

FOREIGN PATENT DOCUMENTS 294719  10/1991  Germany.

*Primary Examiner*—David Buttner
*Attorney, Agent, or Firm*—Saul R. Bresch

[57] ABSTRACT

A process for preparing high density polyethylene in the gas phase comprising contacting a mixture comprising ethylene and one or more alpha-olefins with the supported reaction product of a bis-hydrocarbylsilyl chromate and a hydrocarbylaluminum compound or a hydrocarbyl boron compound in a fluidized bed reactor having a recycle gas line, under particularly defined polymerization conditions, including, but not limited to, the following provisos:

(i) oxygen and/or another catalyst poison is introduced into the reactor in the range of about 0.005 to about 0.5 part by volume of catalyst poison per million parts by volume of ethylene; and (ii) a relatively low boiling inert hydrocarbon is introduced into the recycle gas line in an amount sufficient to raise the dew point of the recycle gas, which is comprised of alpha-olefins and other reactor gases, and the recycle gas is partially condensed and recycled to the reactor where it promotes cooling by evaporation.

7 Claims, No Drawings

PROCESS FOR THE PREPARATION OF POLYETHYLENE

TECHNICAL FIELD

This invention relates to a process for preparing a high density polyethylene, which is particularly useful in pipe, molding, and geomembrane applications.

BACKGROUND INFORMATION

High density polyethylene (HDPE), which spans a density range from 0.940 to 0.958 gram per cubic centimeter, finds application in injection molding, rotational molding, sheet, tubing, hose, and, of particular interest here, pipe, blow molding and geomembranes.

To be competitive, HDPE products for pipe, blow molding and geomembranes should exhibit high resistance to slow crack growth in order to prevent or significantly delay the occurrence of brittle failures under stress. At present, one of the emerging, more widely used testing methodologies for assessing slow crack growth resistance, particularly for pipe, is the Pennsylvania Notch Tensile (PENT) test. The PENT test was developed in an effort to simulate the slow crack growth resistance of a resin or fabricated pipe in an accelerated manner. The PENT test has been approved as ASTM-F 1473 and is widely used in the pipe industry as a quality control 1 quality assurance tool for the production of pressure rated pipe. Further, the HDPE should have consistently good extrusion processability.

Industry is continuously striving to find HDPE's, which, are easily processed, and, in product form, have extended PENT life.

DISCLOSURE OF THE INVENTION

An object of this invention, therefore, is to provide HDPE resins which exhibit high resistance to slow crack growth when converted to pipe, molded articles, geomembranes, or other products, and have a high level of processability. Other objects and advantages will become apparent hereinafter.

According to the present invention such a process has been discovered. The process is one for preparing high density polyethylene in the gas phase comprising contacting a mixture comprising ethylene and one or more alpha-olefins with the supported reaction product of a bis-hydrocarbylsilyl chromate and a hydrocarbylaluminum compound or a hydrocarbyl boron compound in a fluidized bed reactor having a recycle gas line, under polymerization conditions, with the following provisos:

(i) the atomic ratio of aluminum to chromium is in the range of about 0.1:1 to about 2.9:1;

(ii) the amount of catalyst is in the range of about 0.005 to about 0.25 part by weight based on 100 parts by weight of the high density polyethylene;

(iii) the partial pressure of ethylene is in the range of about 200 to about 400 psia;

(iv) oxygen and/or another catalyst poison is introduced into the reactor in the range of about 0.005 to about 0.5 part by volume of catalyst poison per million parts by volume of ethylene;

(v) the molar ratio of alpha-olefin to ethylene is about 0.0001:1 to about 0.1:1;

(vi) hydrogen is introduced into the reactor in the range of about 0.005 to about 0.5 mole of hydrogen per mole of ethylene;

(vii) the polymerization is carried out at a temperature in the range of about 80 to about 110 degrees C.; and (viii) a relatively low boiling inert hydrocarbon is introduced into the recycle gas line where it raises the dew point of the recycle gas, which is comprised of alpha-olefins and other reactor gases, and the recycle gas is partially condensed and recycled to the reactor where it promotes cooling by evaporation.

DESCRIPTION OF THE PREFERRED EMBODIMENT(S)

HDPE is a copolymer of ethylene and one or more alpha-olefins. The alpha-olefin can have 3 to 12 carbon atoms, and preferably has 3 to 8 carbon atoms. Examples of the alpha-olefins are propylene, 1-butene, 1-pentene, 1-hexene, 4-methyl-1-pentene, and 1-octene. One or two alpha-olefins are preferred. The most preferred alpha-olefin is 1-hexene. The total amount of alpha-olefin in the copolymer can be about 0.1 to about 3 parts by weight based on 100 parts by weight of the copolymer, and is preferably about 0.5 to about 2.5 parts by weight. The resin can have a melt index $(I_2)$ in the range of about 0.01 to about 0.5 gram per 10 minutes, and preferably has a melt index $(I_2)$ in the range of about 0.04 to about 0.2 gram per 10 minutes. It can also have a melt index $(I_5)$ of about 0.06 to about 2.5 grams per 10 minutes, and preferably has a melt index $(I_5)$ of about 0.2 to about 1.0 gram per 10 minutes. The resin can have a flow index $(I_{21})$ in the range of about 2 to about 40 grams per 10 minutes, and preferably has a flow index in the range of about 6 to about 20 grams per 10 minutes.

Melt index $(I_2)$ is determined under ASTM D-1238, Condition E. It is measured at 190° C. and 2.16 kilograms and reported as grams per 10 minutes. Melt index $(I_5)$ can be determined under ASTM D-1238, Condition P. It is measured at 190° C. and 5 kilograms and reported as grams per 10 minutes. Flow index $(I_{21})$ is determined under ASTM D-1238, Condition F. It is measured at 190° C. and 21.6 kilograms, and reported as grams per 10 minutes. Melt flow ratio is the ratio of flow index to melt index.

The melt flow ratio $(I_{21}/I_5)$ of the HDPE can be in the range of about 16 to about 33, and is preferably in the range of about 20 to about 29.

The density of the HDPE can be in the range of 0.940 to 0.958 gram per cubic centimeter, and is preferably in the range of 0.943 to 0.953 gram per cubic centimeter.

The copolymerization of ethylene and alpha-olefin(s) in the presence of a catalyst system comprised of the supported reaction product of a bis-hydrocarbylsilyl chromate and a hydrocarbylaluminum compound has been previously disclosed in U.S. Pat. No. 5,137,994. The latter compound is, on occasion, identified as a cocatalyst and, at other times, as a promoter or reducing agent when it is reacted with the chromate prior to carrying out the copolymerization. See, for example, U.S. Pat. Nos. 3,324,095; 3,324,101 and 3,704,287. The bis-triarylsilyl chromates and a method for their preparation are described in these patents. Examples of these compounds are bis-triphenylsilyl chromate; bis-tritolylsilyl chromate; bis-trixylylsilyl chromate; bis-trinaphthylsilyl chromate; bis-triethylphenylsilyl chromate; bis-trimethylnaphthylsilyl chromate; and bis-adamantyl chromate.

The hydrocarbylaluminum compounds that can be used as co-additives are trihydrocarbylaluminum compounds, hydrocarbylaluminum halides, hydrocarbylaluminum hydrocarbyloxides, and hydrocarbylaluminum hydrides. In these compounds, the hydrocarbyl group can contain from 1 to about 14 carbon atoms, and the halogen can be chlorine, bromine, fluorine, or iodine. The hydrocarbyl group can be an alkyl, aralkyl, aryl, alkaryl, alicyclic, or bicyclic group. Examples of the hydrocarbylaluminum compounds are trimethylaluminum, triethylaluminum, tributylaluminum, tridecylaluminum, tridodecylaluminum, diethylaluminum chloride, dibutylaluminum chloride, dibutylaluminum bromide, dibutylaluminum iodide, dibutylaluminum fluoride, dihexylaluminum chloride, methylaluminum dichloride, ethylaluminum dibromide, butylaluminum dichloride, pentylaluminum dichloride, diethylaluminum hydride, dibutylaluminum hydride, dihexylaluminum hydride, methylaluminum dihydride, ethylaluminum dihydride, butylaluminum dihydride, and pentylaluminum dihydride. They can be generically classified as compounds having the formula $R_nAlX_{3-n}$  wherein R is a hydrocarbyl group as defined above, X is a halogen, a hydrocarbyloxide, or a hydrogen and n is an integer from 1 to 3.

The hydrocarbylboron compounds that can be used in the practice of this invention are compounds of the general formula $$BR_3$$

wherein R is a hydrocarbyl group having 1 to 14 carbon atoms. Examples are trimethylborane, triethylborane, triisobutylborane, and tributylborane. Triethylborane is the preferred modifying agent of this class.

The hydrocarbylaluminum hydrocarbyloxides, which are commonly termed "alkylaluminum alkoxides", are compounds of the general formula $$R_nAl(OR)_{3-n}$$ 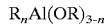

wherein n is an integer from 1 to 2, and R is a hydrocarbyl group having 1 to 14 carbon atoms, preferably 1 to 8 carbon atoms. The hydrocarbyl group can be alkyl, aralkyl, aryl, alkaryl, alicyclic, or bicyclic. Examples are methyl, ethyl, propyl, iso-propyl, n-butyl, iso-butyl, n-pentyl, iso-pentyl, t-pentyl, hexyl, cyclohexyl, 2-methy-pentyl, heptyl, octyl, 2-ethylhexyl, cyclohexylmethyl, nonyl, decyl undecyl, dodecyl, tridecyl, tetradecyl, benzyl, pinyl, pinylmethyl, phenethyl, p-methybenzyl, phenyl, tolyl, xylyl, naphthyl, ethylphenyl, methynaphthyl, dimethylnaphthyl, norborynyl, and norbornyl methyl. The most preferred hydrocarbylaluminum hydrocarbyloxide compound is diethylaluminumethoxide.

In all of the above instances, the hydrocarbyl groups, the halide groups, and the hydride groups are independently selected, i.e., these groups can be the same or different.

As noted above, the reaction product of the chromate and the hydrocarbylaluminum compound or hydrocarbyl boron compound is supported. While silica is the preferred support, other inorganic oxides can be used. Examples of useful support materials are aluminum phosphate, alumina, silica 1 alumina mixtures, silica modified with a hydrocarbylaluminum compound such as triethylaluminum, silica modified with diethylzinc, silica modified with a titanium tetrahydrocarbyloxide compound such as titanium tetraisopropoxide, silica/titania cogels, titanias and a mixture of silica and calcium carbonate. A typical support is a dehydrated, solid, particulate porous material essentially inert to the polymerization. It is used as a dry powder having an average particle size of about 2 to about 250 microns and preferably about 30 to about 180 microns; a surface area of about 100 to about 750 square meters per gram and preferably about 240 to about 550 square meters per gram; and a pore size of about 80 Angstroms to about 300 Angstroms and preferably about 120 to about 250 Angstroms.

The catalyst can be prepared by reacting the bis-triarylsilyl chromate, the hydrocarbylaluminum compound or hydrocarbyl boron compound, and a dehydrated support material together. The bis-triarylsilyl chromate reacts with hydroxyl groups, which are present on the surface of the support. Thus, the chromate is for the most part chemically adsorbed on the surface of the support. Any part of the chromate, which is not chemically adsorbed, is physically adsorbed on the surface of the support. Usually, about 50 to about 100 percent of the chromate is chemically adsorbed. It should be noted, however, that the chromate retains one or more reactive groups, which react with the hydrocarbyl aluminum or boron compound.

The amount of support used is generally that which will provide about 0.01 to about 0.3 millimole of chromium per gram of support and preferably about 0.03 to about 0.1 millimole of chromium per gram of support.

The polymerization is conducted in the gas phase using a fluidized process. It is preferably carried out in the continuous mode. A typical fluidized bed reactor is described in U.S. Pat. No. 4,482,687.

The most important process parameters are as follows:

(i) the atomic ratio of aluminum to chromium can be in the range of about 0.1:1 to about 2.9:1, and is preferably in the range of about 1:1 to about 2:1. Most preferred is a ratio of about 1.5:1.

(ii) the amount of catalyst can be in the range of about 0.005 to about 0.25 parts by weight based on 100 parts by weight of high density polyethylene, and is preferably in the range of about 0.01 to about 0.1 parts by weight.

(iii) the partial pressure of ethylene can be in the range of about 200 to about 400 psia (pounds per square inch absolute), and is preferably in the range of about 210 to about 300 psia. Most preferred is a partial pressure in the range of about 225 to about 275 psia.

(iv) oxygen can be introduced into the reactor in the range of about 0.005 to about 0.5 part by volume per million parts by volume of ethylene feed, and is preferably added in the range of about 0.005 to about 0.25 part by volume per million parts by volume of ethylene feed. The most preferred amount is in the range of about 0.01 to about 0.1 ppmv (part by volume per million parts by volume) of ethylene feed. This can be referred to as "Oxygen Add-Back", which is a dilute system of oxygen in nitrogen added to the reactor in a controlled flow relative to the feed rate of ethylene to the reactor to achieve the desired oxygen add-back level in ppmv. As an alternative to or in combination therewith, other catalyst poisons can be used to produce the same effect. These catalyst poisons can be introduced from external sources just as the oxygen or they can be present as impurities in the ethylene feed or other gases or liquids added to the reactor. Examples of useful and preferred catalyst poisons, in addition to oxygen, are acetone and other oxygen bearing compounds, methanol and other hydroxyl bearing compounds, and water. Various nitrogen, phosphorus, sulfur, arsenic and halogen bearing compounds can also be useful in this respect, but are less commonly encountered as impurities in ethylene feed or other gases or liquids added to the reactor. One of the effects of the catalyst poison is to lower the molecular weight of the polymer. This is reflected in increased melt and flow indices. In any case, oxygen is the preferred catalyst poison.

(v) the molar ratio of alpha-olefin to ethylene can be about 0.0001:1 to about 0.1:1, and is preferably about 0.005:1 to about 0.03:1. Most preferred is a molar ratio of about 0.0075:1 to about 0.01:1.

(vi) hydrogen can be introduced into the reactor in a molar ratio of about 0.005 to about 0.5 mole of hydrogen per mole of ethylene, and is preferably introduced in a molar ratio of about 0.01:1 to about 0.1:1. Most preferred is a molar ratio of about 0.05:1.

(vii) the polymerization can be carried out at a temperature in the range of about 80 to about 110 degrees C., and is preferably carried out at a temperature in the range of about 85 to about 100 degrees C. Most preferred is a temperature in the range of about 90 to about 95 degrees C.

(viii) a relatively low boiling inert hydrocarbon can be introduced into the reactor and passed through the recycle line where it is vaporized when it is introduced upstream of the condenser. The hydrocarbon is introduced in an amount sufficient to raise the dew point temperature of the cycle gas. The cycle gas is partially condensed in the cycle gas cooler, and is recycled to the reactor to promote cooling by evaporation. The hydrocarbon can also be introduced into the recycle gas line downstream from the condenser. This condensing mode technique is discussed in more detail below.

The pressure, i.e., the total pressure in the reactor, can be in the range of about 250 to about 515 psia (pounds per square inch absolute) and is preferably in the range of about 300 to about 415 psia. The ethylene partial pressure is set as noted above. The balance of the total pressure is provided by alpha-olefin(s) and/or an inert gas such as nitrogen.

Volumetric production rates are reported in pounds per hour per cubic foot. This is also referred to as Space/Time/Yield (STY). The STY for the process of the invention can be about 5 to about 20 lbs/hr/ft$^3$, and is preferably about 7.5 to about 15 lbs/hr/ft$^3$.

A typical fluidized bed reactor can be described as follows and is also described in U.S. Pat. No. 4,482,687.

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., alpha-olefins and/or an inert carrier gas, and other reactor gases. As noted, a low boiling inert hydrocarbon is also added to the reactor. When added upstream of the cycle gas cooler, it vaporizes and becomes a part of the cycle gas. This hydrocarbon generally boils (normal boiling point at atmospheric pressure) at a temperature in the range of about minus 10 to about plus 100 degrees C. Examples of these hydrocarbons are isobutane, isopentane, hexane, and heptane. Isopentane and hexane are preferred. Isopentane is introduced into the recycle line in an amount of about 2.5 to about 25 parts by volume per 100 parts by volume of cycle gas. Hexane is introduced in an amount of about 1 to about 10 parts by volume per 100 parts by volume of cycle gas.

The essential parts of the reaction system are the vessel, the bed, the gas distribution plate, inlet and outlet piping, a cycle or recycle gas line, a compressor, cycle gas cooler, and a product discharge system. In the vessel, above the bed, there is a velocity reduction zone, and, in the bed, a reaction zone. Both are above the gas distribution plate. The inert hydrocarbon enters the recycle line, raises the dew point temperature of the cycle (or recycle) gas, is partially condensed in the cycle gas cooler (condenser) when it is added upstream of the cooler, and then passes into the reactor where, along with other condensed cycle gas, it vaporizes and cools the exothermic polymerization reaction. This is a feature of the condensing mode technique described, for example, in U.S. Pat. Nos. 4,543,399 and 4,588,790. The condensed level of the cycle gas at the cycle gas cooler outlet can be about 2.0 to about 25 percent by weight based on the weight of the cycle gas, and is preferably about 5 to about 20 percent by weight. Most preferred is about 7.5 to about 15 weight percent.

It is found that cyclohexane extractables are about 3 to about 7 percent by weight based on the weight of the HDPE, and is preferably about 4 to about 6 percent by weight. Further, PENT test failure times are found to be at least 50 hours, and preferably greater than 60 hours.

The gaseous feed streams of ethylene, other alpha-olefins, hydrogen, and oxygen are preferably fed to the reactor recycle line as well as liquid alpha-olefins and catalyst. The catalyst can be fed as a solid or a mineral oil slurry. Optionally, the catalyst can be fed directly to the fluidized bed. The product composition can be varied by changing the molar ratios of the alpha-olefins introduced into the fluidized bed. The product is continuously discharged in granular or particulate form from the reactor as the bed level builds up with polymerization. The production rate is controlled by adjusting the catalyst feed rate. The reactor temperature and/or oxygen add-back can be adjusted to control average molecular weights.

The residence time of the mixture of reactants including gaseous and liquid reactants, catalyst, and resin in the fluidized bed reactor can be in the range of about 1 to about 4 hours and is preferably in the range of about 1.25 to about 3 hours.

The HDPE resin can be extruded into pipe, or other products in a conventional extruder adapted for the particular product desired. Extruders and processes for extrusion are described in U.S. Pat. Nos. 4,814,135; 4,857,600; 5,076,988; and 5,153,382. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The advantage of the invention lies in the pipe, molding, geomembrane and other products which are produced from the HDPE made from the process of this invention. The products exhibit high resistance to slow crack growth as measured by the Pennsylvania Notch Tensile (PENT) test, i.e., the products survive over 50 hours on the PENT test. The HDPE also shows consistently good extrudability.

Conventional additives, which can be introduced into HDPE's, are exemplified by antioxidants, ultraviolet absorbers, anti-static agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.05 to about 5 parts by weight of additive for each 100 parts by weight of polymer blend. Fillers can be added in amounts up to 20 parts by weight and more for each 100 parts by weight of the blend.

Generally, these products contain a primary antioxidant, a secondary antioxidant, and, in many cases, a processing aid. An example of a primary antioxidant is IRGANOX™ 1010, and an example of a secondary antioxidant is IRGAFOS™ 168. Examples of processing aids are calcium stearate, zinc stearate, and fluoroelastomers. A preferred additive system includes IRGANOX™ 1010 and IRGAFOS™ 168 antioxidants. In parts per million by weight, preferred amounts are about 500 to about 2,000 ppmw for each of the primary and secondary antioxidants, and about 200 to about 800 ppmw for the processing aid. The ppmw are based on a million parts by weight of ethylene.

Patents mentioned in this specification are incorporated by reference herein.

The invention is illustrated by the following examples.

EXAMPLES 1 TO 5

A polymerization is carried out in a typical fluidized bed reactor as described above using as a catalyst the silica supported reaction product of triphenylsilyl chromate and diethylaluminumethoxide having an aluminum/chromium atomic ratio of 1.5:1. The preparation of the catalyst is described above. The catalyst is introduced into the reactor in an amount of 0.02 to 0.04 part by weight per 100 parts by weight of high density polyethylene product. The feed into the recycle line is comprised of ethylene, 1-hexene, hexane, hydrogen, and oxygen (in examples 3 to 5). This is the cycle gas. The total pressure in the reactor is about 325 psia. The balance of the pressure is made up with nitrogen. Variables and results are set forth in the Table. Hexane is introduced in an amount of 4 to 6 parts by volume based on 100 parts by volume of cycle gas.

TABLE

| | | Example | | | | |
|---|---|---|---|---|---|---|
| | | 1 | 2 | 3 | 4 | 5 |
| T | deg C. | 93.4 | 92 | 92.2 | 93.3 | 94.6 |
| $C_2 PP$ | psia | 172 | 235 | 248 | 235 | 243 |
| $H_2/C_2$ | molar | 0.05 | 0.05 | 0.05 | 0.05 | 0.05 |
| $C_6/C_2$ | molar | 0.007 | 0.0085 | 0.0086 | 0.008 | 0.008 |
| $O_2/C_2$ | ppmv | 0 | 0 | 0.04 | 0.021 | 0.037 |
| Res Time | hours | 2.5 | 2.5 | 2.5 | 2.5 | 3 |
| $MI(I_5)$ | g/10 min | 0.42 | 0.4 | 0.38 | 0.39 | 0.4 |
| $FI(I_{21})$ | g/10 min | 10.8 | 10.1 | 10.1 | 10.2 | 9.95 |
| MFR $(I_{21}/I_5)$ | — | 25.5 | 25 | 26.4 | 25.9 | 25 |
| CHE | wt % | 5 | 4.8 | 5.4 | 5.53 | 4.75 |
| Density | g/cc | 0.945 | 0.945 | 0.945 | 0.945 | 0.945 |
| PENT | hours | 30 to 40 | 80 to 90 | 75 to 90 | 70 to 80 | ≧80 |
| Extrudability | — | marginal | good | good | good | good |

Notes to Table:
T = temperature in degrees C.
$C_2 PP$ = ethylene partial pressure in pounds per square inch absolute.
$H_2/C_2$ = molar ratio of hydrogen to ethylene.
$C_6/C_2$ = molar ratio of 1-hexene to ethylene.
$O_2/C_2$ = part by volume of oxygen per million parts by volume of ethylene feed to the reactor. In example 2, the process takes advantage of another catalyst poison present in the ethylene feed in an amount of at least 0.005 ppmv.
Res Time = residence time in hours.
$MI(I_5)$ = melt index at 5 kilograms in grams per 10 minutes.
$FI(I_{21})$ = flow index at 21.6 kilograms in grams per 10 minutes.
$MFR(I_{21}/I_5) = FI(I_{21})/MI(I_5)$ = melt flow ratio
CHE = cyclohexane extractables in weight percent based on the weight of the HDPE product.
Density in gram per cubic centimeter.
PENT = is determined as described above.
Extrudability is a subjective determination based on the extrusion line operator's experience.

We claim:

1. A process for preparing high density polyethylene in the gas phase comprising contacting a mixture comprising ethylene and one or more alpha-olefins with the supported reaction product of a bis-hydrocarbylsilyl chromate and a hydrocarbylaluminum compound or a hydrocarbyl boron compound in a fluidized bed reactor having a recycle gas line, under polymerization conditions, with the following provisos:

(i) the atomic ratio of aluminum to chromium is in the range of about 0.1:1 to 2.9:1;

(ii) the amount of catalyst is in the range of about 0.005 to about 0.25 part by weight based on 100 parts by weight of the high density polyethylene;

(iii) the partial pressure of ethylene is in the range of about 200 to about 400 psia;

(iv) oxygen and/or another catalyst poison is introduced into the reactor in the range of about 0.005 to about 0.5 part by volume of catalyst poison per million parts by volume of ethylene;

(v) the molar ratio of alpha-olefin to ethylene is about 0.0001:1 to about 0.1:1;

(vi) hydrogen is introduced into the reactor in the range of about 0.005 to about 0.5 mole of hydrogen per mole of ethylene;

(vii) the polymerization is carried out at a temperature in the range of about 80 to about 110 degrees C.; and (viii) a relatively low boiling inert hydrocarbon is introduced into the recycle gas line in an amount sufficient to raise the dew point of the recycle gas, which is comprised of alpha-olefins and other reactor gases, and the recycle gas is partially condensed and recycled to the reactor where it promotes cooling by evaporation.

2. The process defined in claim 1 wherein (i) the atomic ratio of aluminum to chromium is in the range of about 1:1 to about 2:1;

(ii) the amount of catalyst is in the range of about 0.01 to about 0.1 part by weight based on 100 parts by weight of high density polyethylene;

(iii) the partial pressure of ethylene is in the range of about 210 to about 300 psia;

(iv) oxygen is introduced into the reactor in the range of about 0.005 to about 0.5 part by volume per million parts by volume of ethylene;

(v) the molar ratio of alpha-olefin to ethylene is in the range of about 0.005:1 to about 0.03:1;

(vi) hydrogen is introduced into the reactor in a ratio of about 0.01 to about 0.1 mole of hydrogen per mole of ethylene; and (vii) the polymerization is carried out at a temperature in the range of about 85 to about 100 degrees C.

3. The process defined in claim 2 wherein (i) the atomic ratio of aluminum to chromium is about 1.5;

(ii) the amount of catalyst is in the range of about 0.01 to about 0.1 part by weight based on 100 parts by weight of high density polyethylene;

(iii) the partial pressure of ethylene is in the range of about 225 to about 275 psia;

(iv) oxygen is introduced into the reactor in the range of about 0.01 to about 0.1 parts by volume per million parts of ethylene;

(v) the alpha-olefin is 1-hexene, and the molar ratio of 1-hexene to ethylene is about 0.0075:1 to about 0.01:1;

(vi) hydrogen is introduced into the reactor in a molar ratio of about 0.05 mole of hydrogen per mole of ethylene; and (vii) the polymerization is carried out at a temperature in the range of about 90 to about 95 degrees C.

4. The process defined in claim 1 wherein, in proviso (viii), the condensed level of the inert hydrocarbon is about 2.5 to about 25 percent by weight based on the weight of the gases passing through the recycle gas line.

5. The process defined in claim 1 wherein the cyclohexane extractables are about 3 to about 7 percent by weight based on the weight of the high density polyethylene; the STY is about 5 to about 20 pounds of high density polyethylene per hour per cubic foot of reactor; and the PENT test failure time is at least 50 hours.

6. The process defined in claim 1 wherein the high density polyethylene prepared by the process has the following properties:

(a) density=0.940 to 0.958 gram per cubic centimeter;

(b) flow index ($I_{21}$)=about 2 to about 40 grams per 10 minutes;

(c) melt index ($I_5$)=about 0.06 to about 2.5 grams per 10 minutes; and (d) melt flow ratio ($I_{21}/I_5$)=about 16 to about 33.

7. A process for preparing high density polyethylene in the gas phase comprising contacting a mixture comprising ethylene and 1-hexene with the silica supported reaction product of a triphenylsilyl chromate and diethylaluminumethoxide in a fluidized bed reactor having a recycle gas line, under polymerization conditions, with the following provisos:

(i) the atomic ratio of aluminum to chromium is about 1.5;

(ii) the amount of catalyst is in the range of about 0.01 to about 0.1 part by weight based on 100 parts by weight of high density polyethylene;

(iii) the partial pressure of ethylene is in the range of about 225 to about 275 psia;

(iv) oxygen is introduced into the reactor in the range of about 0.01 to about 0.1 parts by volume per million parts of ethylene;

(v) the molar ratio of 1-hexene to ethylene is about 0.0075:1 to about 0.01:1;

(vi) hydrogen is introduced into the reactor in a molar ratio of about 0.05 mole of hydrogen per mole of ethylene;

(vii) the polymerization is carried out at a temperature in the range of about 90 to about 95 degrees C.; and (viii) a relatively low boiling inert hydrocarbon is introduced into the recycle gas line in an amount sufficient to raise the dew point of the recycle gas, which is comprised of alpha-olefins and other reactor gases, and the recycle gas is partially condensed and recycled to the reactor where it promotes cooling by evaporation, the condensed level of the inert hydrocarbon being about 2.5 to about 25 percent by weight based on the weight of the gases passing through the recycle gas line.

* * * * *

UNITED STATES PATENT AND TRADEMARK OFFICE
CERTIFICATE OF CORRECTION

PATENT NO. : 6,022,933
DATED : February 8, 2000
INVENTOR(S) : Wright et al.

It is certified that error appears in the above-identified patent and that said Letters Patent is hereby corrected as shown below:

Title page, first column, item [73], change "Peiromont" to -- Petromont --.

Signed and Sealed this

Twenty-eighth Day of November, 2000

Attest:

Q. TODD DICKINSON

Attesting Officer

Director of Patents and Trademarks